Figure 1:
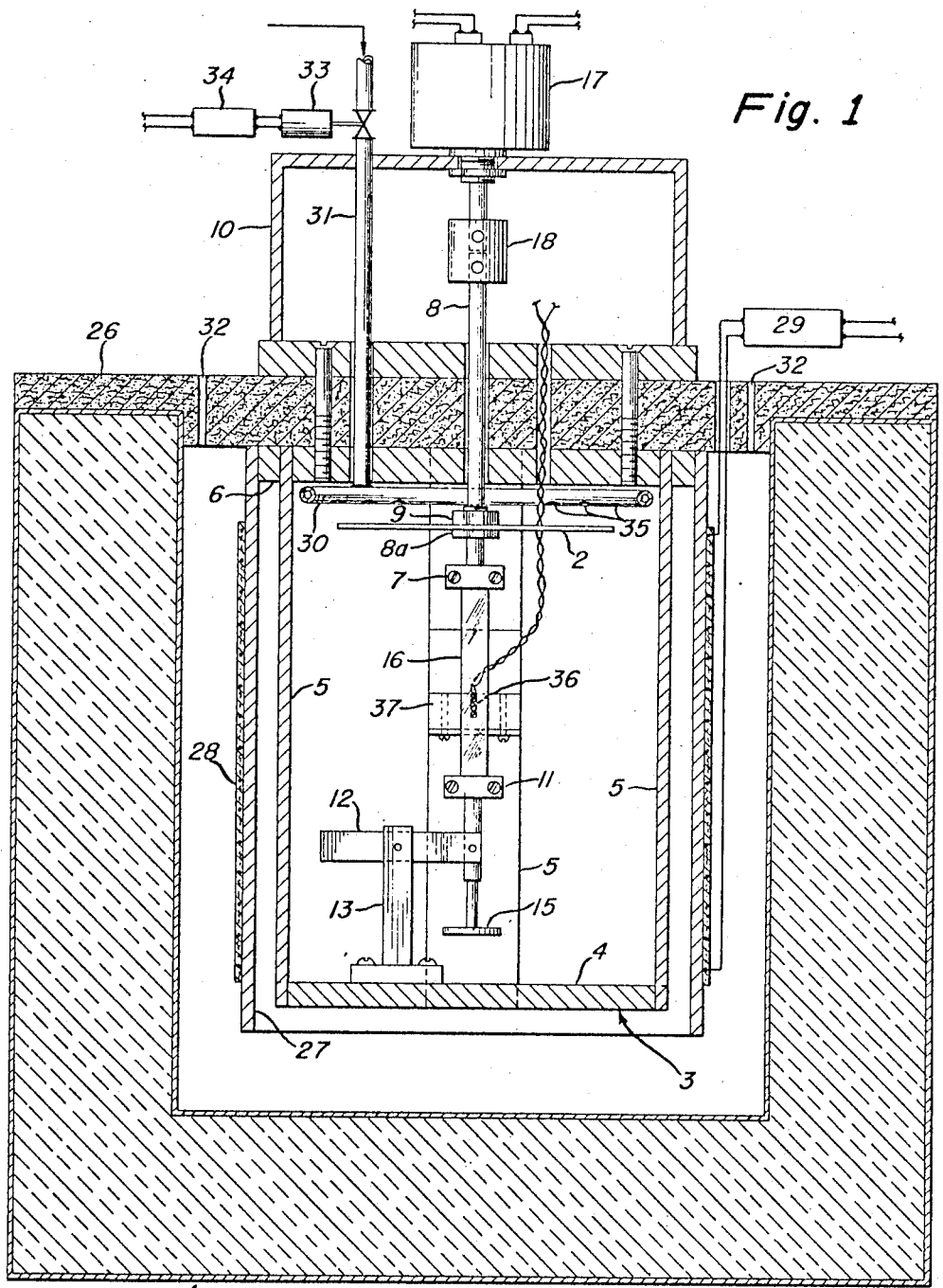

INVENTOR.
Ralph W. Myerholtz, Jr.
BY William T. McClain
ATTORNEY

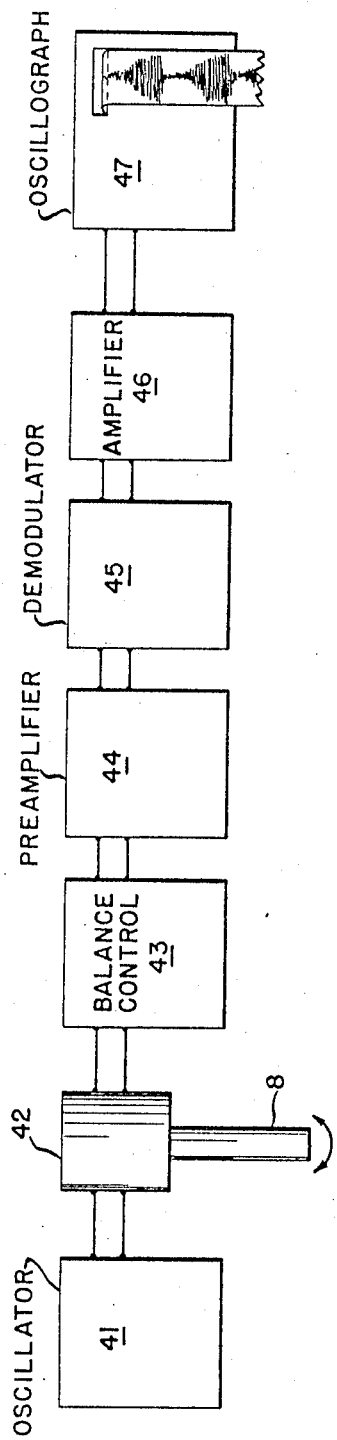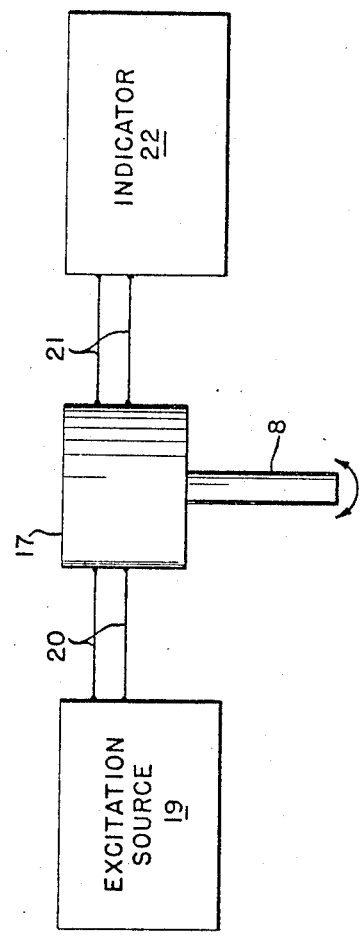

United States Patent Office 3,277,700
Patented Oct. 11, 1966

3,277,700
RECORDING TORSION PENDULUM
Ralph W. Myerholtz, Jr., Highland, Ind., assignor to Standard Oil Company, Chicago, Ill., a corporation of Indiana
Filed Feb. 28, 1963, Ser. No. 261,669
7 Claims. (Cl. 73—99)

This invention relates to apparatus for determining the physical properties of materials, and more particularly it relates to a recording torsion pendulum for determining the dynamic shear modulus and damping characteristics of various materials, especially plastics and the like.

Various types of torsion pendulum apparatus are now used in materials testing work for determining the dynamic shear modulus and damping characteristics of materials. However, because of the nature of their construction, such devices are subject to inherent inaccuracies and difficulty of operation.

An object of this invention is an improved torsion pendulum. A further object is an improved recording torsion pendulum affording simplicity of construction and operation, while at the same time providing a greater degree of accuracy and precision. Still a further object of the invention is improved torsion pendulum apparatus useful in testing materials over a wide range of temperatures.

The above objects and other objects are attained by the apparatus hereinafter set forth and described in connection with the accompanying drawings wherein:

FIGURE 1 illustrates, in partial cross section, the improved torsion pendulum; wherein FIGURE 2 is a schematic representation of the angular position transducer employed in the improved torsion pendulum and the auxiliary equipment used in connection therewith; and FIGURE 3 is a schematic representation of the electrical system employed with a rotary variable differential transformer employed in a preferred embodiment of the invention.

Referring to FIGURE 1, a circular moment of inertia disc 2 having a known moment of inertia is supported by a rigid support member 3, which may comprise a lower base plate 4, vertical supports 5, and an upper plate 6. As shown, the disc is free to rotate in a substantially horizontal plane and is free to turn in respect of the support. The support member is fabricated from a material, such as brass, carbon steel, or other suitable material offering the desired strength and rigidity. The moment of inertia disc is selected to provide the desired moment of inertia, which in the instance where a plastic material such as polyethylene or rubber is used as a test specimen, provides a frequency range of about 0.05 to 100 cycles per second, depending upon the moment of inertia, temperature and specimen dimensions, and rigidity. For example, when testing polyolefins, a brass disc 3.00 inches in diameter and 0.130 inch thick may be used. The moment of inertia of the disc may be calculated from its mass and dimensions or measured directly by methods known to those skilled in the art. A rotating upper specimen clamp member 7 is rigidly attached to and depends from the center of the moment of inertia disc so as to freely rotate therewith when the disc is rotated. A rotating shaft member 8 extends upwardly from the center of and is rigidly attached to the moment of inertia disc by means of the fastener 9 so that the rotating shaft also turns freely with the disc.

Spaced apart from and beneath the upper specimen clamp member 7 is a lower clamp member 11 which is securely attached to the support member 3 so that it is fixed in respect to the rotation of the upper clamp. Preferably, the lower specimen clamp member is fixed in a plane normal to the rotational plane of the disc. Advantageously, the lower specimen clamp member is secured to the support member 3 and pivotably attached through the pivot arm 12 and post 13 to the lower base plate 4, so that the lower specimen clamp member may pivot in a vertical plane normal to the rotational plane of the disc, while at the same time being fixed in respect of the rotation of the disc and upper clamp so that it does not rotate horizontally. This prevents varying tensile loads from being applied to the specimen 16 as it twists back and forth with concurrent small changes in specimen length. If desired, a weight pan 15 may be provided for applying a known tensile load to the test specimen 16 which is firmly held in the clamp members 7 and 11.

In practice, it has been found satisfactory to employ a unitary form of construction for the shaft 8, supporting flange 8a and the stationary portion of the clamp 7, with these parts being machined from a single piece of metal. The disc 2 is then supported on the flange 8a and keyed to the shaft 8, with a lock-nut 9 securely fastening the disc to the shaft. Thus, discs of varying moments of inertia can readily be interchanged in the apparatus. The upper end of the shaft 8 then is coupled directly to the shaft of the transducer 17.

The angular position transducer 17 is rotatably supported by mounting bracket 10 and is connected to the rotating shaft member 8 through a coupling 18 to convert the rotary motion of the rotating shaft to an electrical signal having an amplitude and polarity which is proportional to the degree and direction of the rotation of the shaft. Various well known angular position transducers may be employed in the present apparatus as hereinafter described.

The angular position transducer 17, as shown in FIGURE 2, is electrically connected to an excitation source 19 by electrical connection 20 to energize the transducer and the electrical signal produced by the transducer is passed by way of electrical connection 21 to an indicator means 22 which receives the signal and indicates the degree and direction of rotation of the rotating shaft 8. An oscillograph, oscilloscope (with camera) or recorder having a suitable response time may be employed for this purpose.

To conduct a test, a test specimen 16 of measured dimensions is clamped in the specimen clamps 7 and 11 and the rotating shaft 8 is turned, say from about 2 to 30°, normally about 2 to 5°, and released. This may be accomplished manually or by a suitable arrangement of electro magnets. Upon release, the pendulum oscillates with a period and rate of decay of amplitude dependent upon the characteristics of the test specimen. The shear modulus of the specimen may be calculated from the period of the pendulum, sample dimensions and moment of inertia of the system, while the logarithmic decrement of damping is calculated from the rate of decay. The latter measures energy absorption by the sample and is related to its toughness. A plot of logarithmic decrement vs. temperature reveals any physical transitions, such as second order transitions or glass transitions, occurring in the specimen. The test specimen consists of a strip of the material to be tested, such as a cut or molded strip of plastic, usually from about 0.001 to about 0.125 inch in thickness, about 0.25 inch wide and about 2.5 inches long. To simplify the calculations a gauge block, typically about 2.000 inches long, is used to insure constant grip separation when inserting specimens.

In calculating the shear modulus of a test specimen, the moment of inertia is determined for the disc, the upper specimen clamp, the rotating shaft, and the coupling. The moment of inertia of the angular position transducer also can be employed in the calculations, although this is quite small and of little effect.

A preferred angular position transducer is a rotary variable differential transformer, which is a device for producing a voltage whose magnitude varies linearly with change of angular position. One such rotary variable differential transformer is commercially available from Schaevitz Engineering, Camden, New Jersey, and is described in Bulletins A5 and A6 published by that company. Another such rotary differential transformer is available from Bourns, Inc., Riverside, California, and is described in Bulletin No. 2200/K/9 published by such company. However, other angular transducers such as a contactless potentiometer employing a beam of light striking a photo-conductive track may also be employed in the present invention. Such a potentiometer is the Betapot potentiometer available from Duncan Electronics, Inc., Costa Mesa, California, and is described in Bulletin No. 613 8/6 published by such company. Also, angular position transducers utilizing a variable reluctance to provide a means of obtaining an alternating current output as a function of shaft rotation may be employed. Such a device is the model 2203 angular position transducer available from Bourns, Inc., Riverside, California, and described in bulletin 2203/H/9 published by such company.

Further, an angular position transducer operating on the basis of a change in capacitance may be used to provide a means of obtaining an electrical signal which is a function of shaft position. Such a device may comprise one or more capacitor plates rigidly attached to, but insulated from, the support member and a similar plate or set of plates attached to the rotating shaft of the torsion pendulum with the two plates or sets of plates arranged so that as the shaft rotates the capacitance between the plates vary. Various electronic circuits may be used to convert the change in capacities to a suitable electrical signal. One such suitable circuit is described in U.S. Patent 2,831,166 issued to Louis J. Rogers et al. The rotating shaft can be so fabricated as to use a portion thereof as one plate of the capacitor, if desired. The change in capacitance can be converted into an electrical signal by employing the capacitor as part of a bridge circuit or part of a tuned circuit.

The effect of temperature on the properties of the material to be tested can be readily studied with the present apparatus. The mechanical components of the torsion pendulum, shown in FIGURE 1, can be suspended in an insulated container 25, with the angular position transducer 17 mounted exteriorly of the container above a cover plate 26 which preferably is of an insulator material, such an Transite. The mounting bracket and transducer are supported on the cover plate as shown. Suspended from the cover plate and surrounding the test specimen 16 is a detachable cylinder 27 which is heated by an electrical heater 28 wound around the cylinder. The heater 28 is connected to a temperature controller 29, for example a West Gardsman proportioning temperature controller, which may be used for achieving temperatures from ambient up to about 300° C. The apparatus may also be cooled to achieve lower temperatures. A preferred scheme for achieving temperatures from −195° C. to ambient is to employ a gas coolant, such as liquid nitrogen, introduced through conduit 31 to circular ring 30 positioned within the container above the disc 2. The ring 30 is provided with perforations 35 to distribute the nitrogen in the container and to cool the specimen. The nitrogen then flows throughout the container and exits through holes 32 provided in the cover plate 26. When cooling, the temperature is controlled by regulating the amount of nitrogen passed into the container, for example, by actuating a solenoid valve 33 on the nitrogen supply line through a temperature controller 34. When elevated temperatures are used, a slight flow of nitrogen or other inert gas may be passed into the container through the conduit to blanket and to prevent oxidation of the specimen, and to help achieve a uniform temperature. A thermocouple 36, mounted on a bracket 37 close to the specimen, is employed to sense the temperature within the container.

A preferred form of the improved torsion pendulum apparatus, as mentioned, employs a rotary variable differential transformer as the angular position transducer. The transducer, as shown in FIGURE 1, is coupled to rotating shaft 8 and electrically connected to a carrier frequency oscillator 41, as shown in FIGURE 3, which is employed to energize the rotary differential transformer 42. The oscillator 41 supplies a voltage to the primary of the rotary differential transformer. The output signal from the transformer is passed to a balance control unit 43 and then to the preamplifier 44. The signal is then passed to demodulator 45 and amplifier 46, and then to oscillograph 47 which provides a record of the oscillations of the specimen and of time.

The preamplifier 44 may be any suitable preamplifier. Typically, a Sanborn (Sanborn Company, Waltham, Massachusetts) model 150–1100 carrier preamplifier and a Sanborn model 150–400 power supply-driver amplifier are used to energize the differential transformer and to demodulate and amplify the output signal produced by the transformer. The output of these units is fed to a Sanborn 150–100A oscillograph to record the oscillations of the pendulum. To ensure proper operation of the preamplifier balancing control, additional resistors are inserted in the leads between the preamplifier and transformer. The oscillograph chart speed is chosen to give a tracing that is properly compressed for the frequency of the measurement, and the chart speed must be known to properly determine the period and frequency of oscillation.

As previously mentioned, transducers other than the rotary differential transformer may be employed in the present invention and in each case a suitable electrical system may be employed in a manner obvious to the skilled artisan to provide a suitable current to be fed to the indicator means. For example, when using the above mentioned contactless potentiometer, such device may be employed as one arm of a direct current Wheatstone bridge circuit with suitable fixed and variable resistors in the remaining arms of the bridge. In this instance, the bridge is balanced with the potentiometer shaft, which is connected to the upper specimen clamp of the pendulum, at the center or the rest position. When the pendulum is set into oscillation, the bridge output voltage varies in amplitude and polarity in direct relationship to the motion of the pendulum. The bridge may be energized by any suitable source, such as a mercury cell, voltage regulated power supply, etc. In such an arrangement, the bridge output may be fed to a suitable oscillograph, as mentioned above, and the need for the above described preamplifier and demodulator is eliminated.

The above described preferred embodiment of the present apparatus has been satisfactorily used and can provide a reproducibility of results of about 1–2%. Materials with shear modulus values ranging from 1,000 to 150,000 p.s.i. have been handled without difficulty. The apparatus has been employed in testing materials at temperatures ranging from −170° C. to 120° C. without difficulty. The apparatus has been found to be capable of providing more precise routine measurements than other presently available methods for measuring shear modulus.

From the foregoing description of my invention, various alternate elements and modifications in the details of construction will become apparent to the skilled artisan, and as such, these fall within the spirit and the scope of the invention.

Having described my invention, what I claim is:

1. Materials testing apparatus which comprises: a supported and freely rotatable moment-of-inertia disc; a rotatable shaft member rigidly attached to said disc to rotate therewith, the plane of said disc and the plane of rotation of said disc being substantially perpendicular to the longitudinal axis of said shaft member; two specimen clamp members, said clamp members being spaced apart and being adapted to receive a test specimen, the first of said clamp members being rigidly connected to said rotatable shaft member to rotate therewith, the second of said clamp members being non-rotatable in a plane parallel to the plane of rotation of said disc and being movable for short distances along the extension of the rotational axis of said disc; an angular position transducer connected to said rotatable shaft member to convert the rotary motion of said shaft member to an electrical signal having an amplitude and polarity proportional to the degree and direction of rotation of said shaft member; and indicator means connected to said transducer to receive said signal and to indicate the degree and direction of rotation of said shaft member.

2. Materials testing apparatus which comprises: a rigid support member; a moment-of-inertia disc mounted upon said support member and freely rotatable in respect thereof in a substantially horizontal plane; a rotatable shaft member rigidly attached to said disc to rotate therewith and extending upwardly therefrom, the longitudinal axis of said shaft member being perpendicular to the plane of said disc; two specimen clamp members being positioned one below the other and being adapted to receive a test specimen, the longitudinal axis of which is perpendicular to the plane of said disc, the first of said clamp members being rotatable in a plane parallel to the plane of rotation of said disc and rigidly disposed in relation to said disc and said shaft member to rotate therewith and along the extension of the rotational axis of said disc and beneath the plane of said disc, the second of said clamp members being non-rotatable in a plane parallel to the plane of rotation of said disc and being pivotably attached to said support member to move for short distances along the extension of the vertical axis of said disc; an angular position transducer connected to said rotatable shaft member to convert the rotary motion of said shaft member to an electrical signal having an amplitude and polarity proportional to the degree and direction of rotation of said shaft member; and recorder means connected to said transducer to receive said signal and to indicate the degree and direction of rotation of said shaft member.

3. The apparatus of claim 2 wherein said transducer is a rotary variable differential transformer.

4. The apparatus of claim 2 wherein said recorder means is a recording oscillograph.

5. The apparatus of claim 2 wherein means are provided for varying the temperature of the specimen to be tested.

6. Materials testing apparatus which comprises: a rigid support member; a moment of inertia disc mounted upon said support member and freely rotatable in respect thereof in a substantially horizontal plane; a first specimen clamp member rotatable in a plane parallel to the plane of rotation of said disc and rigidly disposed in relation to said disc to rotate therewith and along the extension of the vertical axis of said disc and beneath the plane of said disc; a second specimen clamp member which is horizontally non-rotatable and is positioned beneath said first clamp member, said second clamp member being fixed in respect of the rotation of said first clamp member and being movable for short distances along the extension of the vertical axis of said disc, said specimen clamp members being adapted to receive a test specimen, the longitudinal axis of which is perpendicular to the plane of said disc; a rotating shaft member rigidly attached to said disc to rotate therewith and extending upwardly therefrom; a rotary variable differential transformer coupled to said rotating shaft member and positioned above to said disc; and a recording oscillograph connected to said transformer to receive an electrical signal produced thereby and to record the degree and direction of rotation of said shaft member.

7. Materials testing apparatus which comprises: a rigid support member; a moment-of-inertia disc supported by said support member and freely rotatable in respect thereof in a substantially horizontal plane; a rotatable shaft member rigidly attached to said disc to rotate therewith and extending upwardly therefrom, the longitudinal axis of said shaft member being perpendicular to the plane of said disc; two specimen clamp members being positioned one below the other and being adapted to receive a test specimen, the longitudinal axis of which is perpendicular to the plane of said disc, the first of said clamp members being rotatable in a plane parallel to the plane of rotation of said disc and rigidly disposed in relation to said disc and said shaft member to rotate therewith and along the extension of the rotational axis of said disc and beneath the plane of said disc, the second of said clamp members being non-rotatable in a plane parallel to the plane of rotation of said disc and being pivotably attached to said support member to move for short distances along the extension of the rotational axis of said disc; and an angular position transducing means connected to said rotating shaft member and adapted to convert the rotary motion of said shaft member to an electrical signal having an amplitude and polarity proportional to the degree and direction of rotation of said shaft member.

References Cited by the Examiner

UNITED STATES PATENTS

| | | | |
|---|---|---|---|
| 2,579,424 | 12/1951 | Gehman | 73—99 X |
| 2,593,389 | 4/1952 | Nielsen | 73—99 |
| 2,666,324 | 1/1954 | Stott | 73—99 |
| 2,909,764 | 10/1959 | Chambers | 73—99 X |
| 3,105,381 | 10/1963 | Collette | 73—99 |

RICHARD C. QUEISSER, *Primary Examiner.*

DAVID SCHONBERG, *Examiner.*

L. MOK, G. M. GRON, *Assistant Examiner.*